United States Patent [19]

Scott

[11] Patent Number: 5,819,992
[45] Date of Patent: Oct. 13, 1998

[54] MULTI CHAMBER TRANSFER DEVICE

[75] Inventor: Kenneth Eli Scott, Rangiora, New Zealand

[73] Assignee: Convertech Group Limited, Rangiora, New Zealand

[21] Appl. No.: 615,177

[22] PCT Filed: Sep. 19, 1994

[86] PCT No.: PCT/NZ94/00097

§ 371 Date: Apr. 3, 1996

§ 102(e) Date: Apr. 3, 1996

[87] PCT Pub. No.: WO95/10723

PCT Pub. Date: Apr. 20, 1995

[30] Foreign Application Priority Data

Oct. 8, 1993 [NZ] New Zealand .......................... 248895

[51] Int. Cl.⁶ ........................................... G01F 11/10
[52] U.S. Cl. ........................... 222/370; 48/209; 414/219
[58] Field of Search ........................... 222/370; 414/217, 414/219; 137/625.11; 48/209

[56] References Cited

U.S. PATENT DOCUMENTS

| | | | |
|---|---|---|---|
| 1,995,145 | 3/1935 | Frost | 92/41 |
| 2,947,654 | 8/1960 | Chapman | 154/100 |
| 4,043,049 | 8/1977 | Hedstrom | 34/10 |
| 4,152,197 | 5/1979 | Lindahl et al. | 162/19 |
| 4,326,913 | 4/1982 | Mattson | 162/17 |
| 4,376,600 | 3/1983 | Egli | 406/63 |
| 4,606,789 | 8/1986 | Reinhall | 162/23 |
| 4,708,746 | 11/1987 | Hinger | 127/37 |
| 5,094,403 | 3/1992 | Tschumi | 222/370 X |

FOREIGN PATENT DOCUMENTS

| | | |
|---|---|---|
| B 23350/45 | 9/1945 | Australia . |
| A-81241/87 | 5/1989 | Australia . |
| A-55013/90 | 11/1990 | Australia . |
| 1141376 | 2/1983 | Canada . |
| 1213711 | 11/1986 | Canada . |
| 1275286 | 10/1990 | Canada . |
| 0073714 | 3/1983 | European Pat. Off. . |
| 0161766 | 11/1985 | European Pat. Off. . |
| 0170239 | 2/1986 | European Pat. Off. . |
| 0172135 | 2/1986 | European Pat. Off. . |
| 0373726 | 6/1990 | European Pat. Off. . |
| 2528427 | 12/1983 | France . |
| 2544757 | 10/1984 | France . |
| 276344 | of 0000 | United Kingdom . |
| 2158485 A | 11/1985 | United Kingdom . |
| 2230975 | 7/1990 | United Kingdom . |
| WO 83/03856 | 11/1983 | WIPO . |
| WO 89/04394 | 5/1989 | WIPO . |

OTHER PUBLICATIONS

Y.N. Kholkin, "Technology of hydrolysing products", Moscow Publishers, Forestry Industry, dated Jan. 6, 1989 pp. 183–187.
Abstract of French 2,278,125 S A Basile.
Abstract of Japan 58–135030—Aritsume Moriyama, Sankou Kuuki Souchi.
Abstract of Japan 2–255423—Yasuo Kiuchi, Kikkoman Corp.

Primary Examiner—Gregory L. Huson
Attorney, Agent, or Firm—Nikaido Marmelstein Murray & Oram, LLP

[57] ABSTRACT

A transfer device for passing material between two different fluid environments which uses a multi-passageway rotor member rotatable about a vertical axis and interposed between upper and lower ported members. Each passageway (or chamber) passes through the rotor and has a major axis parallel to the vertical axis of the rotor. Rotation of the rotor brings each passageway successively into fluid communication with the upper ported member whereby the passageway is filled with material, then to at least one position where the passageway is not aligned with either ported member, and finally to a position where the passageway is aligned with the lower ported member and the material is transferred to the second environment. The rotation may be continuous or incremental, and the fluid environments are maintained in isolation from each other. Methods of transferring solids, and a solids transfer system in a steam hydrolysis and drying plant are also disclosed.

10 Claims, 15 Drawing Sheets

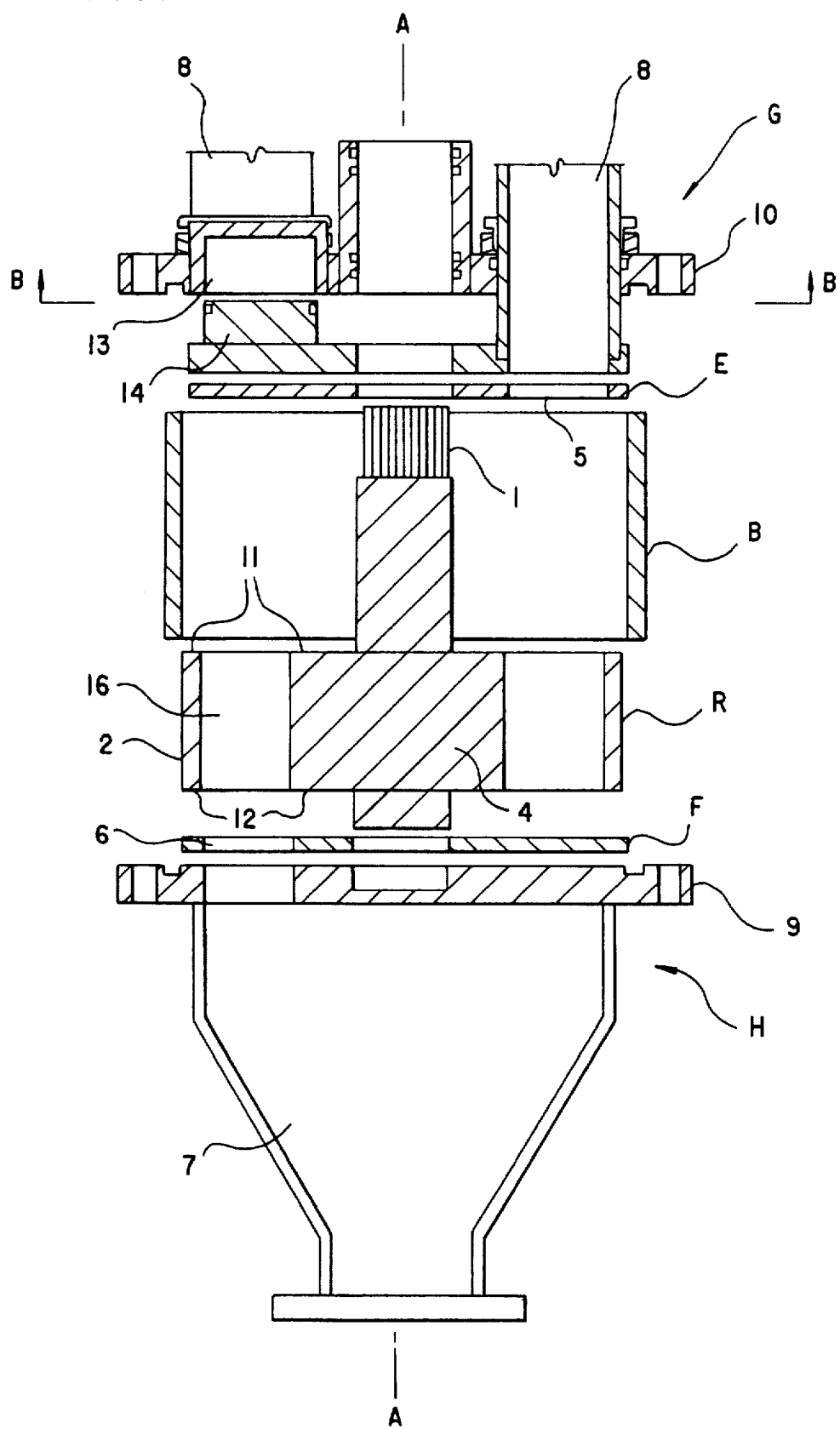

5,819,992

MULTI CHAMBER TRANSFER DEVICE

TECHNICAL FIELD

The present invention relates to improvements in and/or relating to multi chamber transfer devices (eg. valves) useful in transferring between different pressure zones (if there be any pressure difference at all) solid materials in particulate, powdered or any other form along with associated gases and liquids preferably capable of being transferred under the assistance of gravity.

BACKGROUND ART

In our New Zealand Patent Specification No. 229080 (European equivalent Application No. 90304922.9 and Australian equivalent Application No. 55013/90) there is disclosed a process of preparing a hydrolysed lignocellulosic material, the full content of which is hereby incorporated by way of reference.

The present invention could have application in such a process/system between different pressure situations or in improved versions thereof. Indeed, the present invention can provide an alternative in many situations to the very expensive and high upkeep "Bauer valves" (Sprout-Bauer inlet rotary valves manufactured and sold by Andritz Sprout-Bauer Australia Pty. Limited of 22 Princes Highway, Dandenong, Victoria 3175, Australia), or any such other rotary devices or devices that do not involve rotary chambers and which are used by default in the absence of an economic way of feeding materials from one vessel to another.

DISCLOSURE OF INVENTION

It is, therefore, an object of the present invention to provide an alternative to existing transfer devices.

In a first aspect the present invention consists in a transfer device for, or operatively incorporated in a system for, transferring materials from one fluid environment to another without substantial loss of one fluid into the other owing to any pressure differential between the environments, said device being of a kind having a top member or assembly having at least one port (hereinafter "ported top member") to receive to said port(s) from above fluid and materials of said one fluid environment, a bottom member or assembly having at least one port (hereinafter "ported bottom member") to lead down into said second fluid environment, and a rotatable rotor or carousel member (hereafter "carousel member") having a plurality of both opened topped and opened bottomed passageways, each capable of being serially (a) registered to a port of said ported top member while out of register with any port(s) of said ported bottom member, (b) out of register with any port(s) of said ported top and bottom members, and (c) registered to a port of said bottom ported member while out of register with any port of said ported top member, the device being characterised in that there is provided means to rotate said carousel member intermittently so that each passageway can in its turn progress through the conditions (a), (b) and (c) serially with a dwell period at each and being further characterised in that means is provided to maximise a sealing pressure to the assembly such that each of said ported top and ported bottom members seal about the open topped and open bottom passageways of the rotatable carousel member more during any such dwell period than at any time when the carousel member is being moved.

Preferably said intermittent movement of said transfer device is such that each of said dwell periods is longer than each of the periods of time needed to move the rotatable carousel members between adjacent cyclic conditions.

Preferably a fluid pressure provides said sealing pressure, one or other of said ported top and ported bottom members having at least one part thereof acting as a piston movable parallel to the rotational axis of said carousel member by selective pressurisation of a cylinder or chamber closed by said piston, an increased pressurisation increasing the sealing pressure.

Preferably a means is provided whereby said cylinder(s) or chamber(s) of said piston or pistons are capable of being vented to reduce the sealing pressure.

Preferably when operatively connected into a system and the fluid pressure in one or other of said fluid environments is higher than the other.

Preferably the fluid pressure of that environment having the higher pressure is used as a means of pressurising that piston integral with or which indirectly acts upon one or other of said ported top and ported bottom members so as to increase the sealing pressure.

Preferably there are two ports in each of said ported top and ported bottom members and six or eight passageways in said rotatable carousel members such that for each condition a passageway has of the kind (a) and subsequently (c), there is therebetween one or two positions (b).

Preferably said rotatable carousel member includes an axial shaft having axially distanced from said passageways a pawl drivable ratchet wheel, the interengagement and operation of which provides the required intermittent movement of said rotatable carousel member in use.

In a second aspect the invention consists in a steam hydrolysis and drying plant for lignocellulosic materials the use of a transfer device as claimed in any one of the preceding claims to pass, with gravity assistance, the solids stream for a primary steam system into a lower but still elevated pressure secondary steam system, both systems being at elevated temperature(s), said sealing pressure(s) reducing steam flow from one system to the other.

Preferably the sealing pressure during dwell periods prevents steam moving between the systems.

BRIEF DESCRIPTION OF DRAWINGS

Preferred forms of the present invention will now be described with reference to the accompanying drawings in which:

FIG. 3 is a similar view to that of FIG. 2 but showing the apparatus in an exploded form so as to more easily explain its makeup;

BEST MODE(S) FOR CARRYING OUT THE INVENTION

Figure 1:
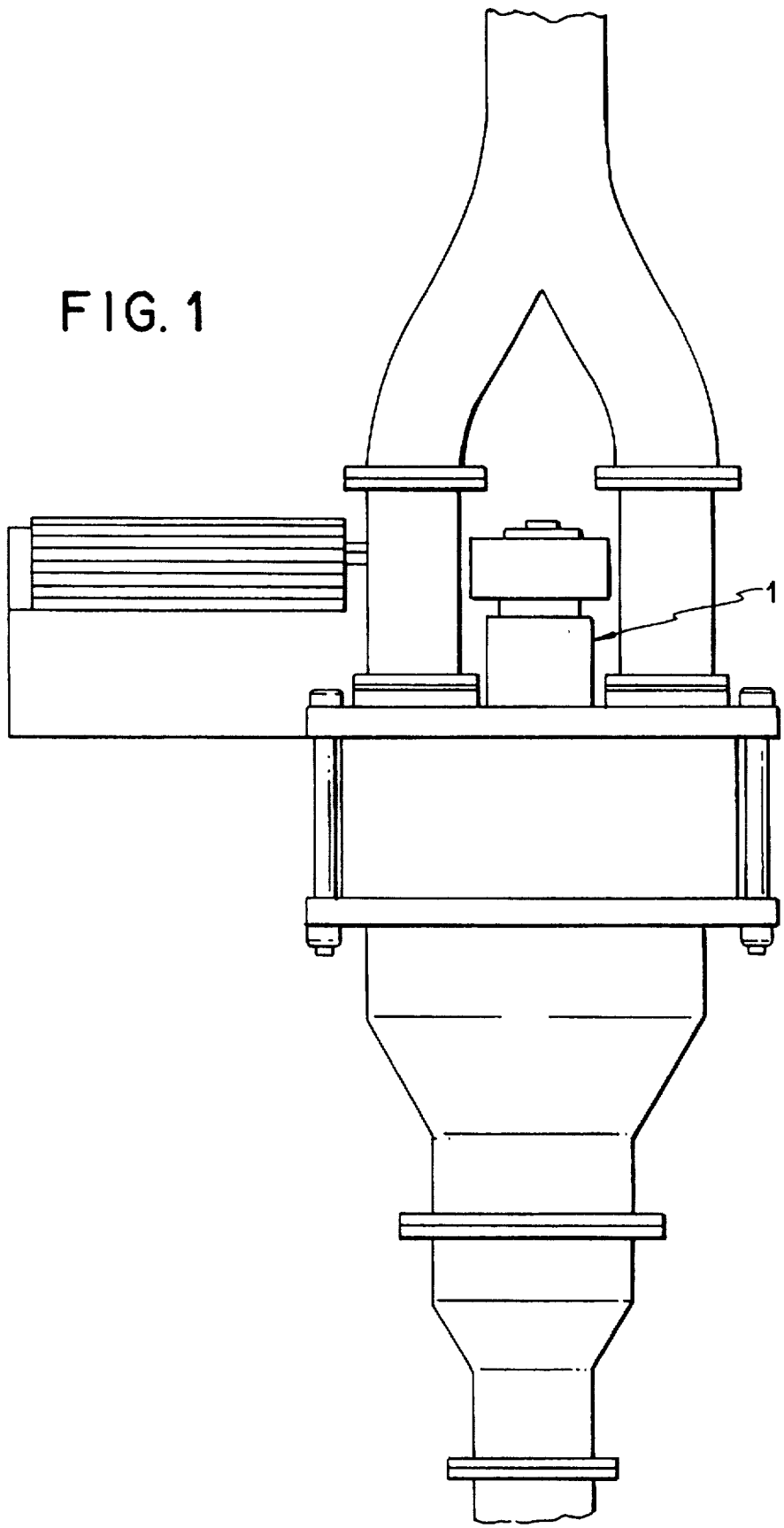
FIG. 1 is a diagrammatic view of an assembled multi chamber transfer device in accordance with the present invention having ducting providing diverging conduits for providing two dump streams for intermittent alignment via the ports of the top plate (not shown) to be received into the aligned passageways (thus forming the chambers) while the corresponding bottom plate with its two dump ports is out of phase or register therewith (such bottom plate not being shown in FIG. 1), FIG. 1 showing how, if desired, a spindle, shaft or the like can extend beyond sealed parts of the assembly to be driven by means of some appropriate driving device.
Figure 5:
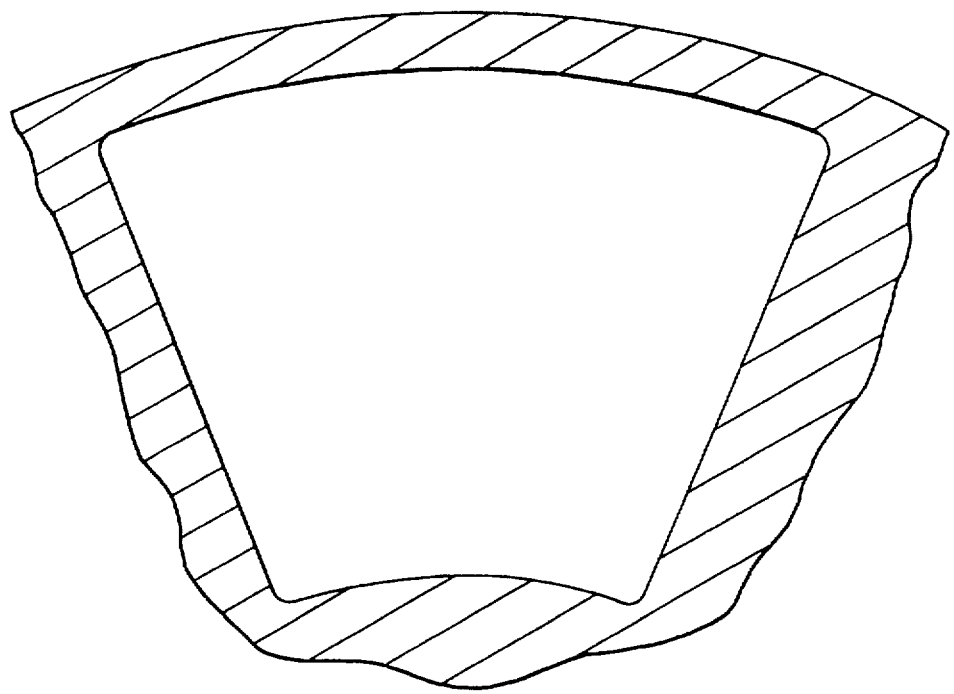
FIG. 5 shows a preferred form of section of a rotor, FIG. 5A showing how the preferred rotor R would appear in plan.
Figure 5A:
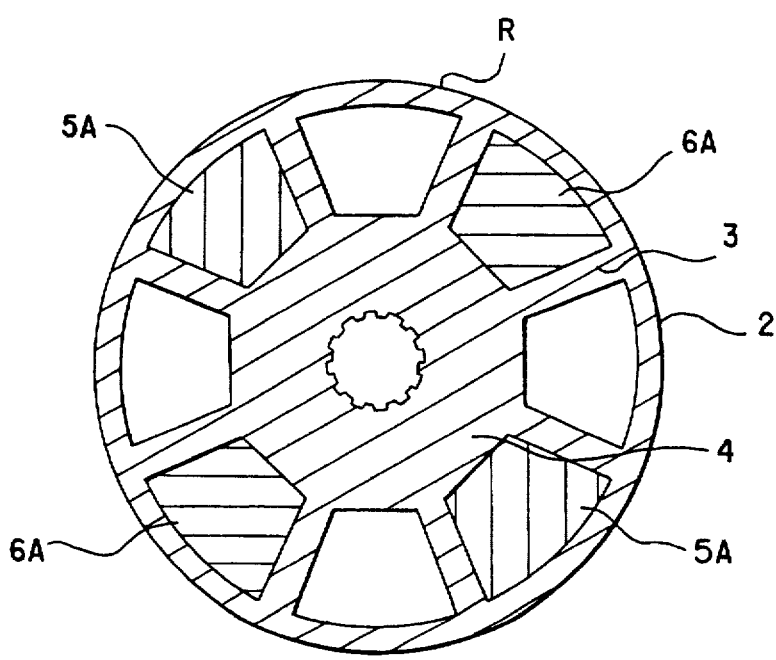

In the preferred form of the present invention there is a rotor R having, in plan, the configuration as shown in FIG. 5A preferably with eight chambers therein capable of being operated in the sequence as shown in FIG. 5A. The rotor R is rotatable under the action of a sprocket gear shaft or the like 1 (see FIG. 1). The top and bottom plates, E and F respectively (see FIG. 3), seal on the perimeter annulus 2 of the rotor R as well as against the vanes 3 and central core 4 thereof. Top and bottom plates E and F, therefore, with preferably their opposed ports 5 and 6 respectively, are capable of being brought in and out of register with the corresponding passageways 5a of FIG. 5A. For example the dump ports 6 are capable of being brought in and out of phase as appropriate with opposed dump passageways or chambers 6A (see FIG. 5A).

The assembly is such as to apply pressure on top and bottom plates E and F (see FIG. 3) and to this purpose, therefore, these plates can be considered as wear plates and preferably are formed from an appropriate material. Appropriate materials include, but are not limited to, PEEK (polyetheretherketone) or Polybenzymidazole.

The structure is held in a sealing relationship so that the dumped material to be discharged into the chamber 7 of the housing H and the materials to be dumped via the conduits 8 do not open substantially to atmospheric pressure. This feature provides the pressure differential often required and which has often, in the past, required the so called Bauer Valve previously referred to. It can be seen for this purpose that a flange member 9 in the bottom housing H and a flange member 10 in the top housing G is provided with annular rebates to accommodate each end of the barrel (the annular barrel) B while at the same time providing means whereby there can be pressure placed on the respective wear plates E and F and thus on the upper and lower surfaces 11 and 12 of the rotor R.

Figure 2:
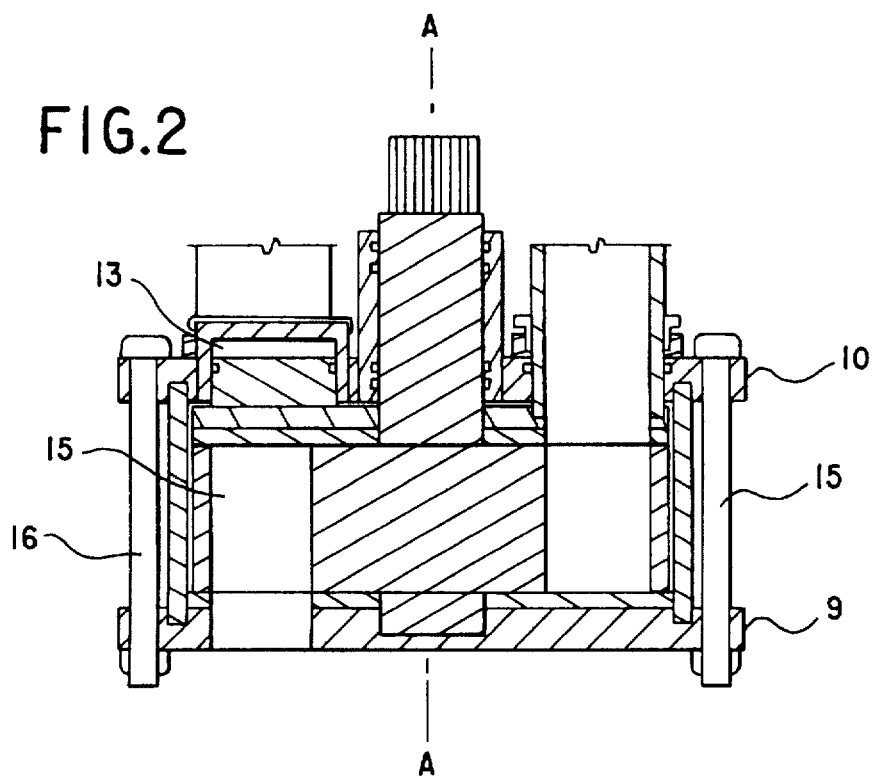
FIG. 2 is an internal view of an assembly in accordance with FIG. 1 but showing, on either side of the line A (the central axis), different phasings of the structure so that on the right hand side there is shown a top plate having a fill port in communication with a passageway of the rotor while on the left hand side a fill port is not in communication with a passageway but rather the dump port of the bottom plate is.
Figure 4:
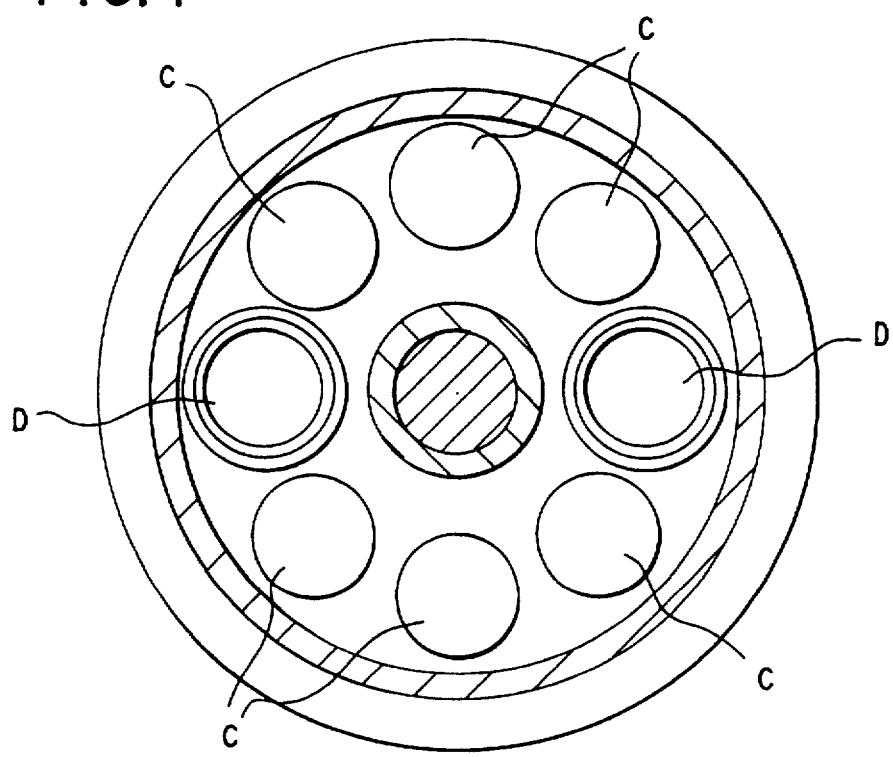
FIG. 4 is a plan view from below of the housing part B—B shown in FIG. 3 showing opposed filling/dumping conduits/ports which are located between top and bottom plates E and F and held in juxta position thereby by the pressure being applied between the top housing assembly G and the bottom housing assembly H in conjunction with the barrel B.

To assist the seal and to ensure an absolute maximum of seal, when there is communication via a port in a plate 9 or 10 (the latter being via the conduits 8) via the respective plates F or E, pressure can be increased at any desired time under the action of fluid optionally pumped into chambers 13 to act on bosses or pistons 14 (please see FIGS. 2, 3 and 4). In FIG. 4 the particular chambers are referred to by the letter "C" while the dump conduits D are those referred to in FIGS. 2 and 3 as 8.

Persons skilled in the art will appreciate, therefore, that by raising and lowering the pressure in the chambers C or 13 pressure can be maintained to ensure adequate sealing during the incremental movements which are preferably very brief when compared with actual dwell times during the intermittent movements when sequentially each chamber or passageway 16 of the rotor R is in communication with the filling port 5 (and conduit 8), is not in communication with either port (thence 8 or 7) and then has its lower end brought into communication with the dump port 6 and thus is in communication with chamber 7.

The outer casing of the transfer device can, itself, be in the form of a pressure housing thus enabling the highest pressure to be handled by the transfer device in relation to the materials it is handling to be approached outside of the required seal to thereby reduce the duty of the seals insofar as pressure differential is concerned. Persons skilled in the art will appreciate how, if desired, a pressure can be applied within the barrel B and between the plates 9 and 10 to reduce the pressure differential acting on the seals between the rotor R and the wear plates E and F (see FIG. 3).

The present invention has particular application where it is positioned vertically but can operate where it is slightly off vertical or where impetus for the movement of the materials can be provided by other means. In that sense, therefore, the reference to being assisted by gravity can be such as to refer to a vertical situation or substantially vertical situation where there might not be any other impetus for movement other than gravity or to other situations where other means might be provided, eg. rams or the like that might even allow the operation of the device in horizontal conditions.

Also the reference to solids transfer between fluid systems also encompasses liquid transfer between gas systems whether also in conjunction with true "solids" or not.

Figure 6:
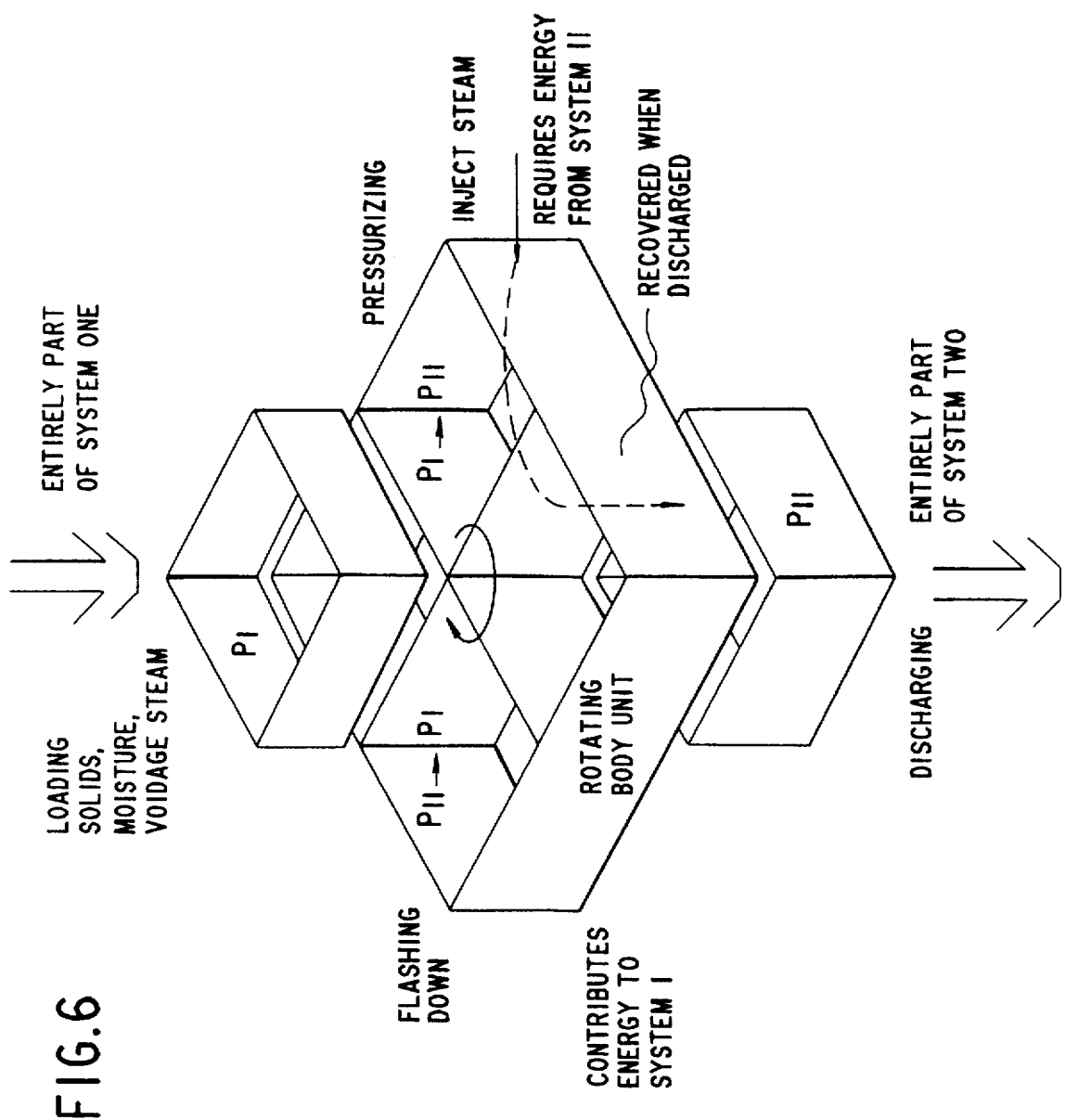
FIG. 6 is a flow diagram showing, by reference to a simplified diagrammatic form of the present invention, the flow arrangement.

The operation is depicted diagrammatically in FIG. 6 in the form of a flow diagram showing the passage of solids, moisture and voidable steam from a system I into a system II where the pressures PI and PII are shown in conjunction with the rotating body unit and showing by reference to the flashing down (PII-PI) and the pressurising (PI-PII) respectively the provision of steam energy into system I and the drawing of energy from system II (but which is largely recoverable) respectively.

Figure 7:
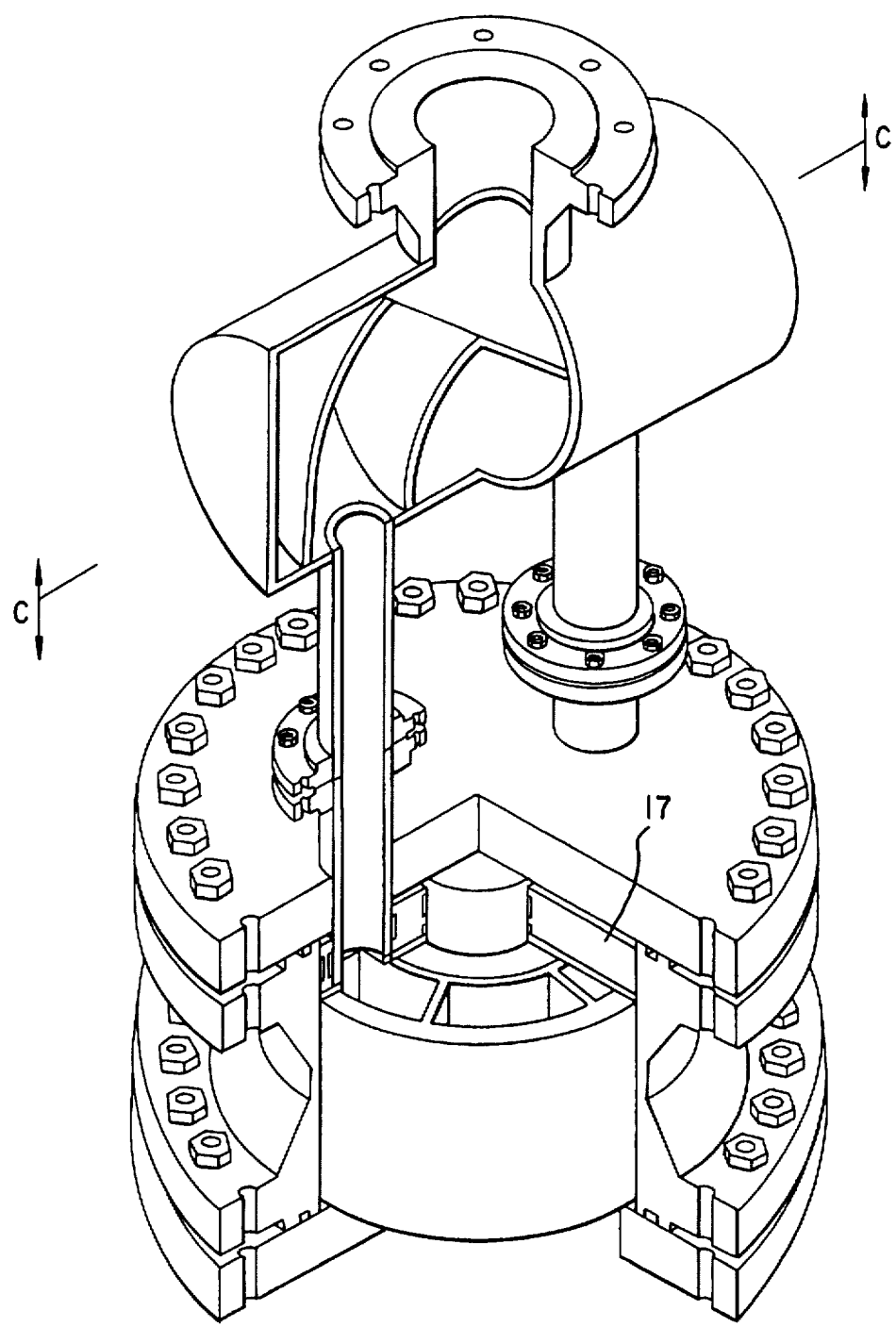
FIG. 7 is a perspective cut-away drawing of a preferred eight passageway two port pairs form of the device where the filling ports of the ported top member is fed from a first fluid pressurised system with solids via a flow splitter.
Figure 8:
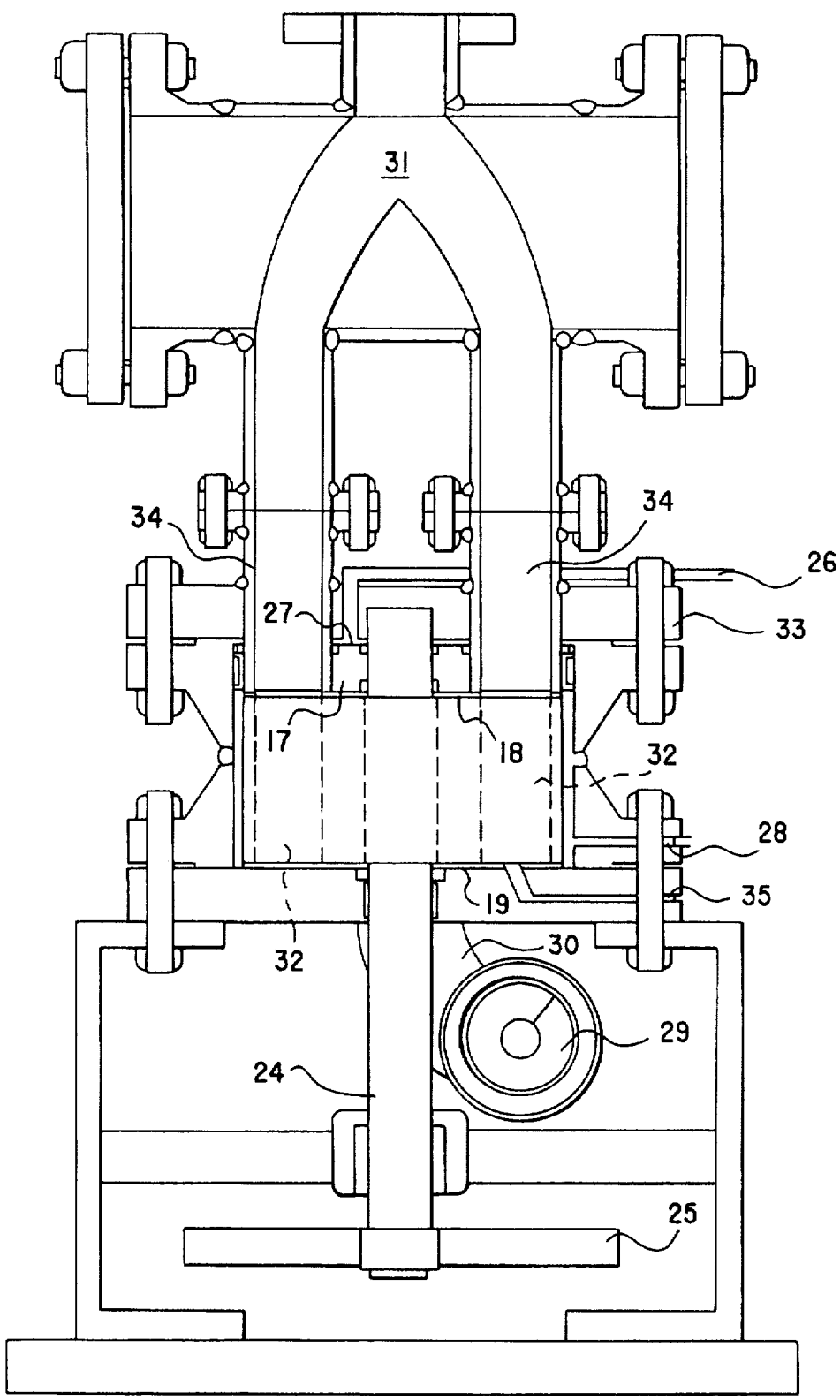
FIG. 8 is an elevational view of the apparatus of FIG. 7 taken at the section C—C showing with respect to FIG. 7 a housing for an incremental drive wheel.
Figure 9:
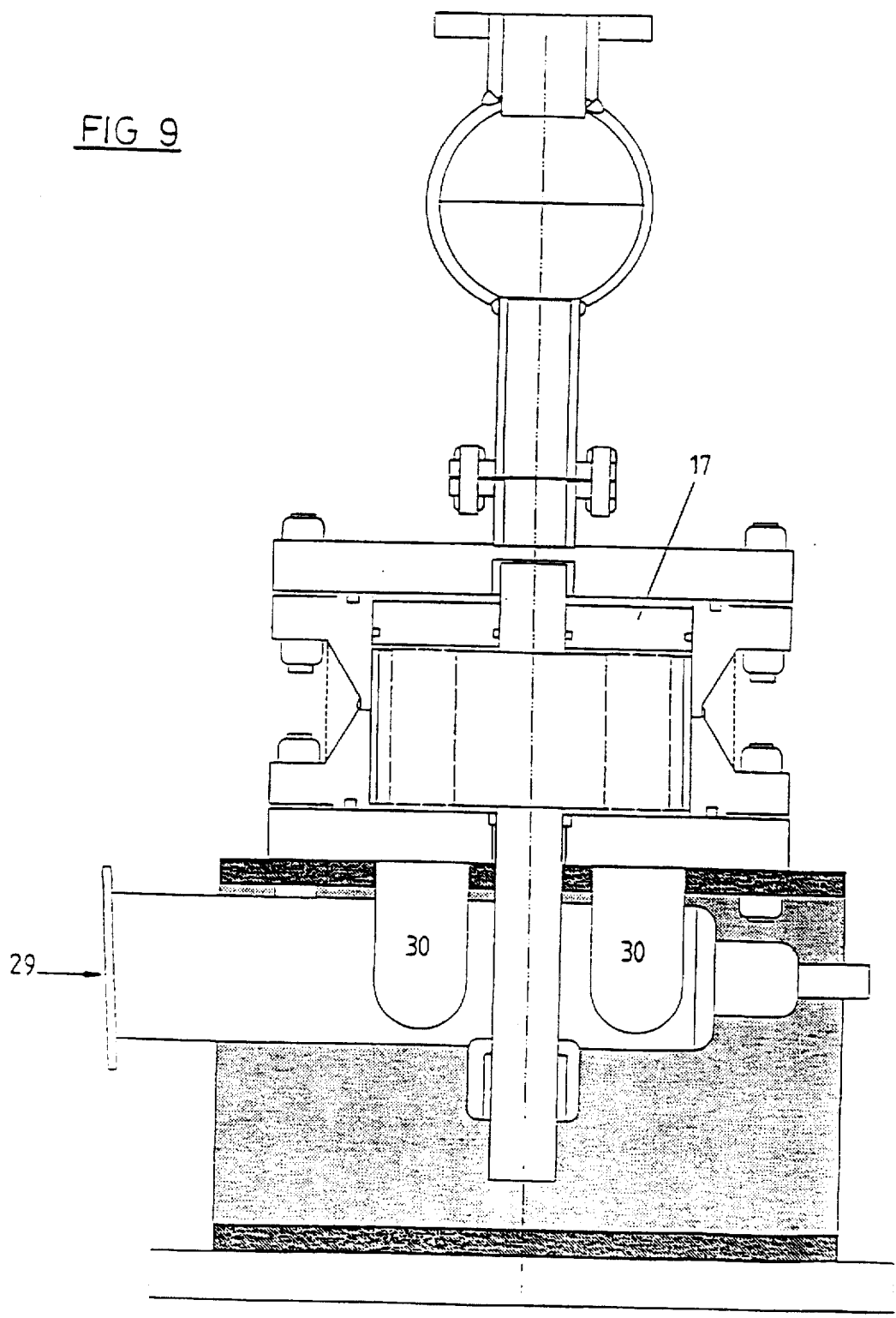
FIG. 9 is a view of the arrangement shown in FIG. 8 commencing at the top at the section D but varying therefrom downwardly in order to better demonstrate the makeup of the apparatus of FIG. 8, the incremental drive wheel having been omitted for sake of clarity.

FIG. 7 shows a preferred form of the present invention in a three dimensional form showing a piston member 17 best seen in FIGS. 8, 9, 18, and 19 capable of being downwardly pressurised to better squeeze seals (or wear plates eg of PEEK) 18 and 19 between the rotor and piston member 17 and the rotor and base member 21 respectively.

Figure 17:
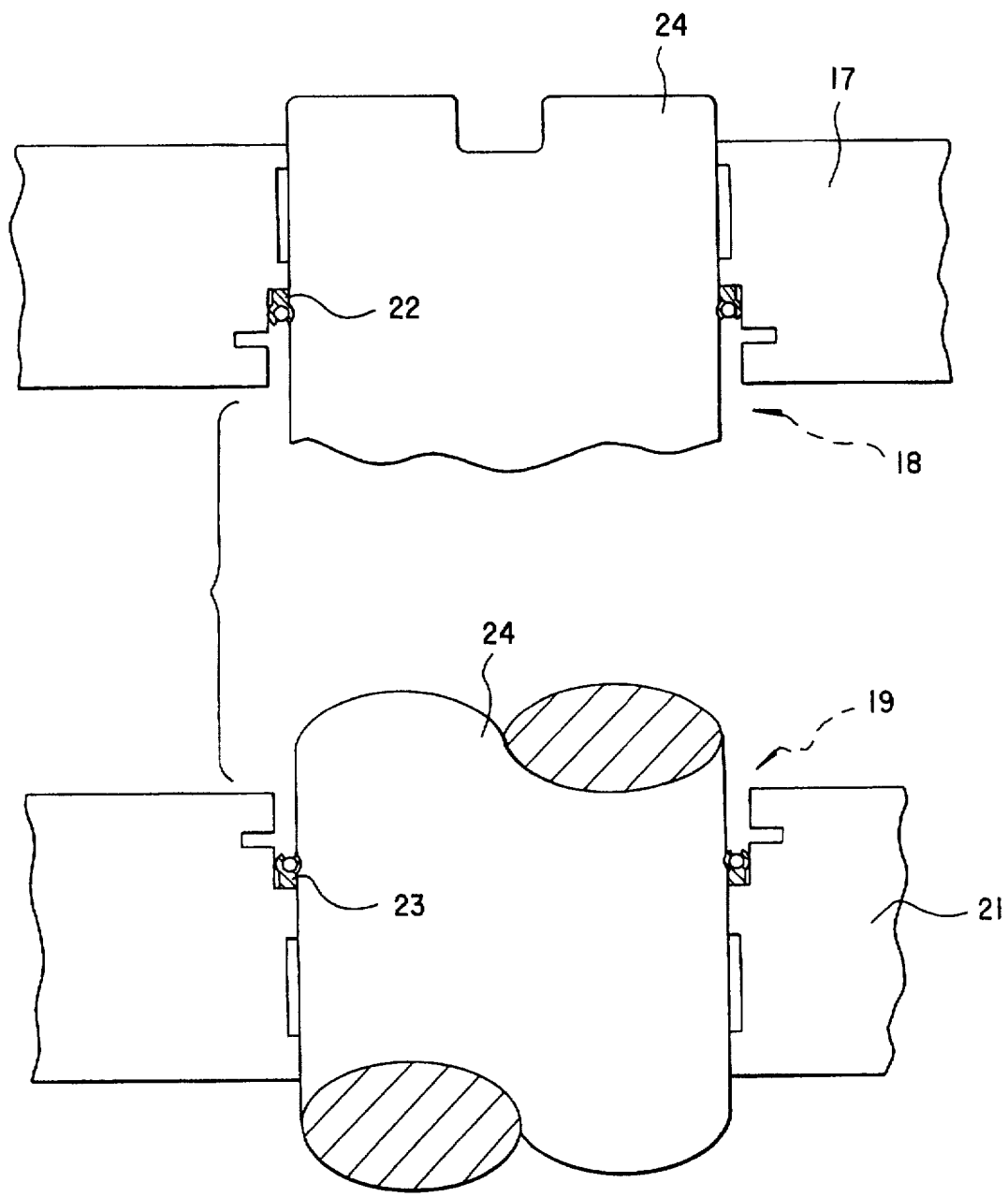
FIG. 17 is a diagrammatic view showing the seal provisions top and bottom for the central mounting shaft shown in FIGS. 18 and 19 for (i) the piston underlying the member of FIGS. 15 and 16 and (ii) FIGS. 13 and 14 (the base) respectively.
Figure 19:
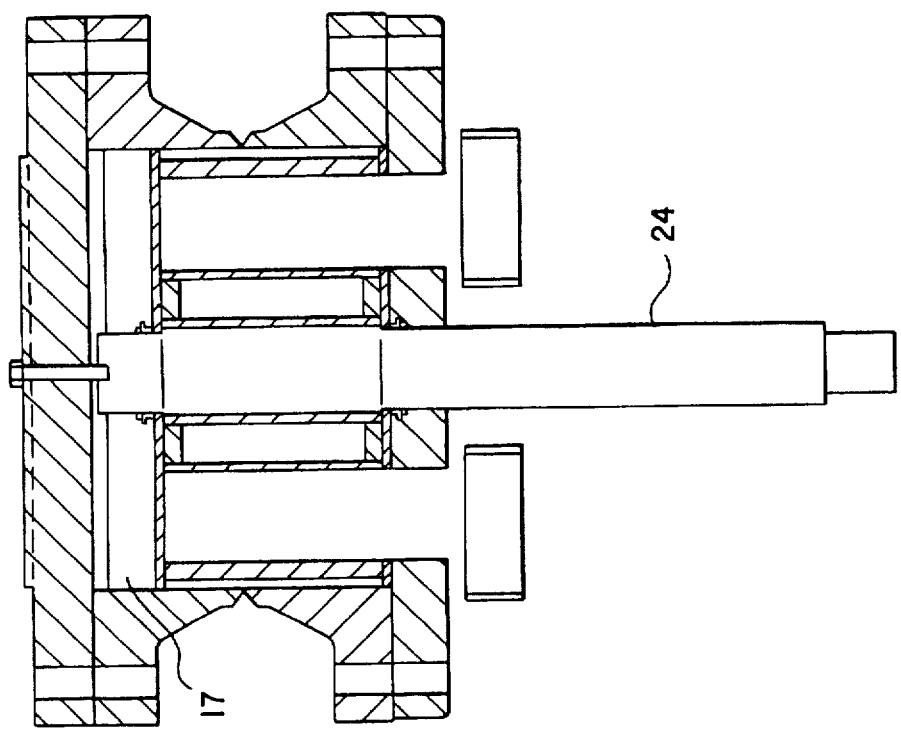
FIG. 19 is a similar view to that of FIG. 18 but showing the rotor with two passageways that in FIG. 18 are in communication with the ported top member closing the tops of two passageways which are now in register with and open to a bottom port, each of FIGS. 18 and 19 showing a non rotating seal or seal assembly interposed between the rotor or carousel member and the top cap piston or base respectively, such seals respectively acting as a top ported member or part of an assembly thereof and a ported bottom member or assembly thereof.
Figure 18:
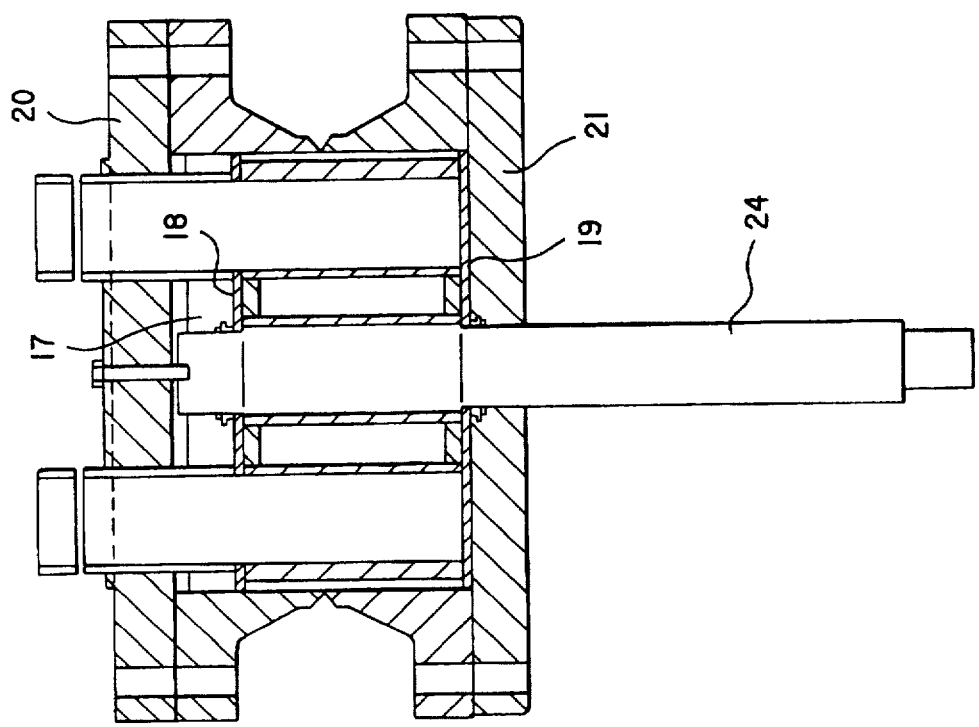
FIG. 18 shows the complex ported top member assembly in elevational section (the ports being a short length of tube) and showing the preferred use of seals (eg PEEK) both above the base member of FIGS. 13 and 14 and below the piston (ie top ported members)
Figure 20:
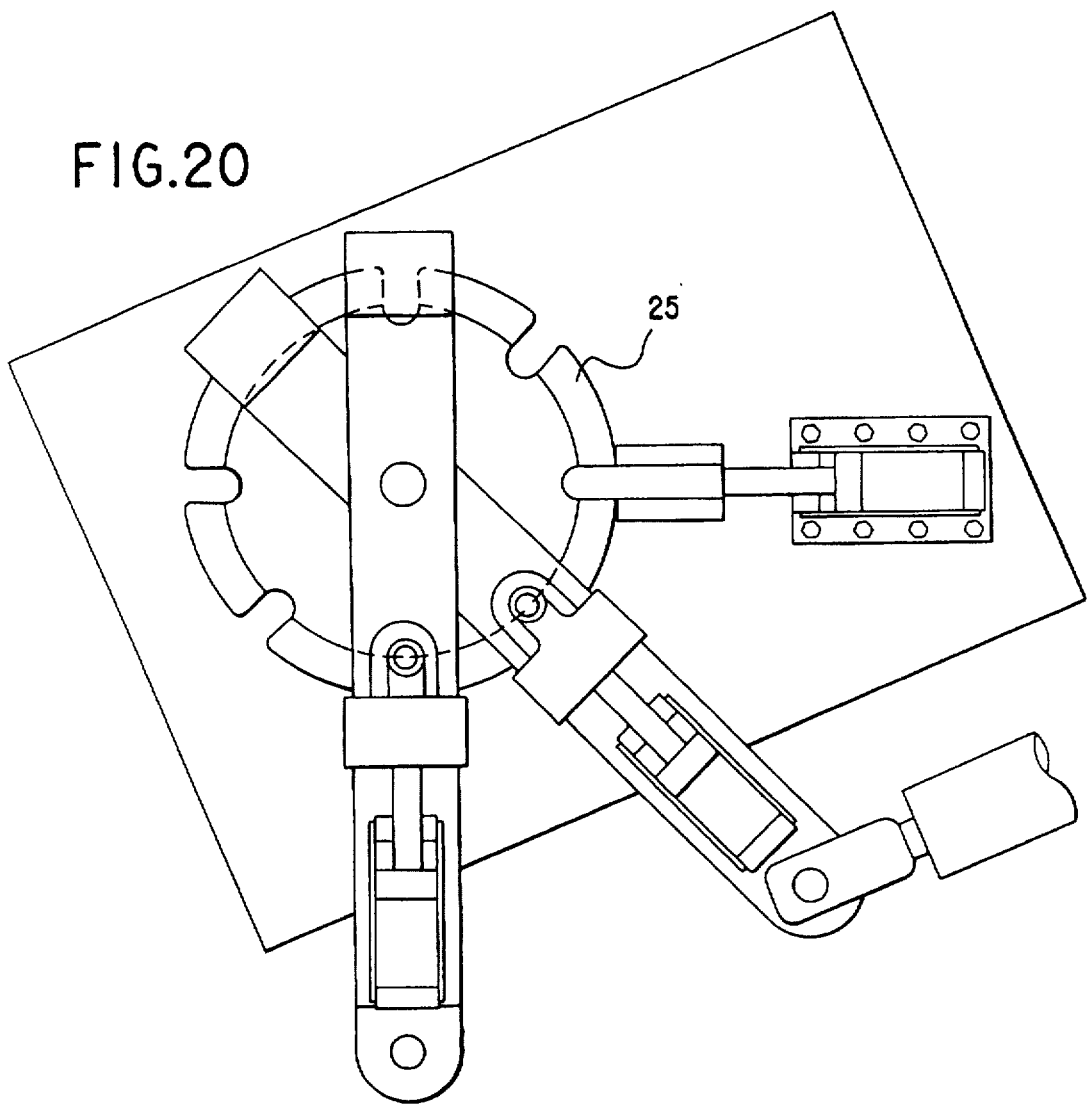
FIG. 20 is a diagram showing how an incremental drive wheel such as that depicted in the bottom of FIG. 8 can have, by way of example, eight recesses in the perimeter thereof adapted to be ratchet driven by a fluid actuated piston or the equivalent (and is capable of being locked by another fluid actuated piston in a dwell condition between movements)

FIG. 17 shows annular seals 22 and 23 respectively providing appropriate seals between the piston 17 and the base member 21 respectively with the shaft 24 of the rotor assembly on the bottom end of which (as in FIG. 8) a drive wheel 25 better shown in FIG. 20 of the ratchet drive is described.

Figure 10:
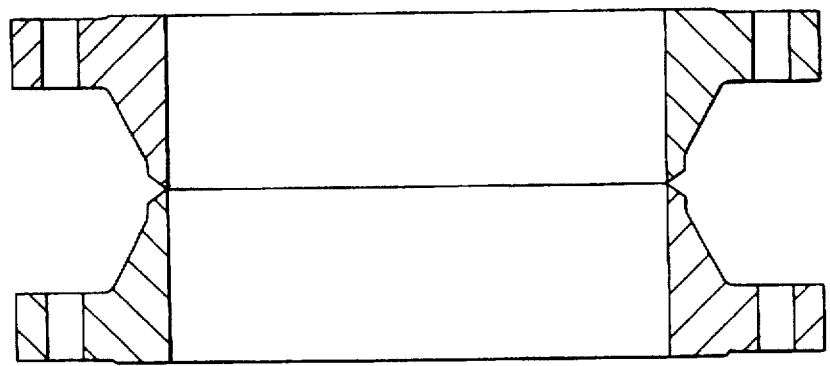
FIG. 10 is a sectional elevation view of a preferred housing member for the rotor such as employed in the embodiments of FIGS. 7 through 9 collectively.
Figure 11:
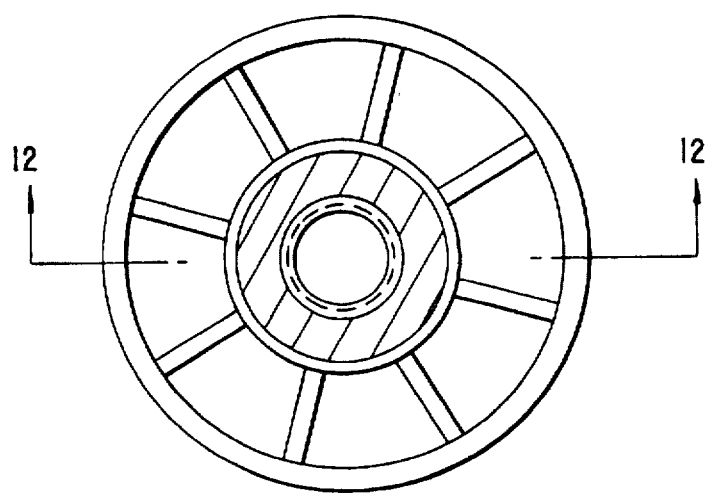
FIG. 11 is a plan view of a rotor or carousel member assembly capable of being housed within the housing of FIG. 10.
Figure 12:
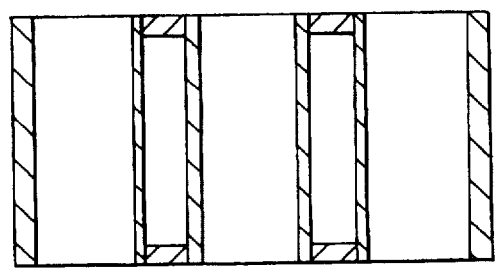
FIG. 12 is an elevational sectional view in the direction 12—12 of the rotor or carousel member of FIG. 11 showing the fabrication of the preferred rotor assembly.
Figure 13:
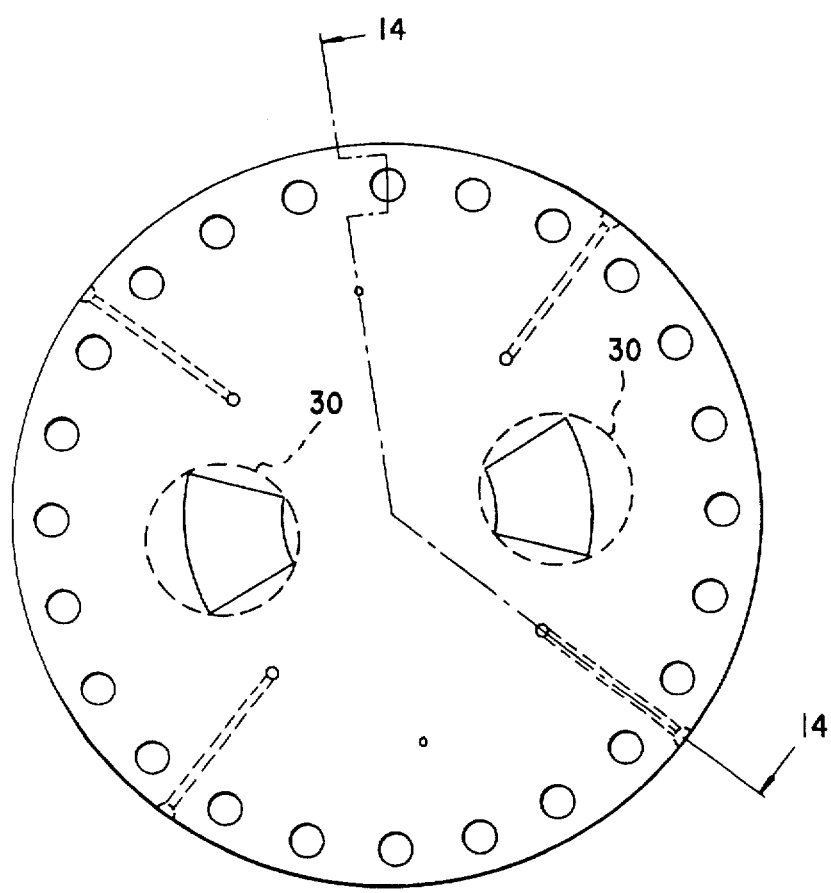
FIG. 13 is a plan view of a ported bottom member capable of underlying a corresponding seal.
Figure 14:
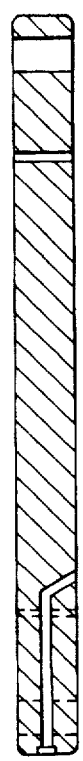
FIG. 14 is a sectional view B—B of the ported bottom member shown in FIG. 13 showing one of the four steam ports leading to the perimeter of the member shown in FIG. 13.
Figures 15, 16:
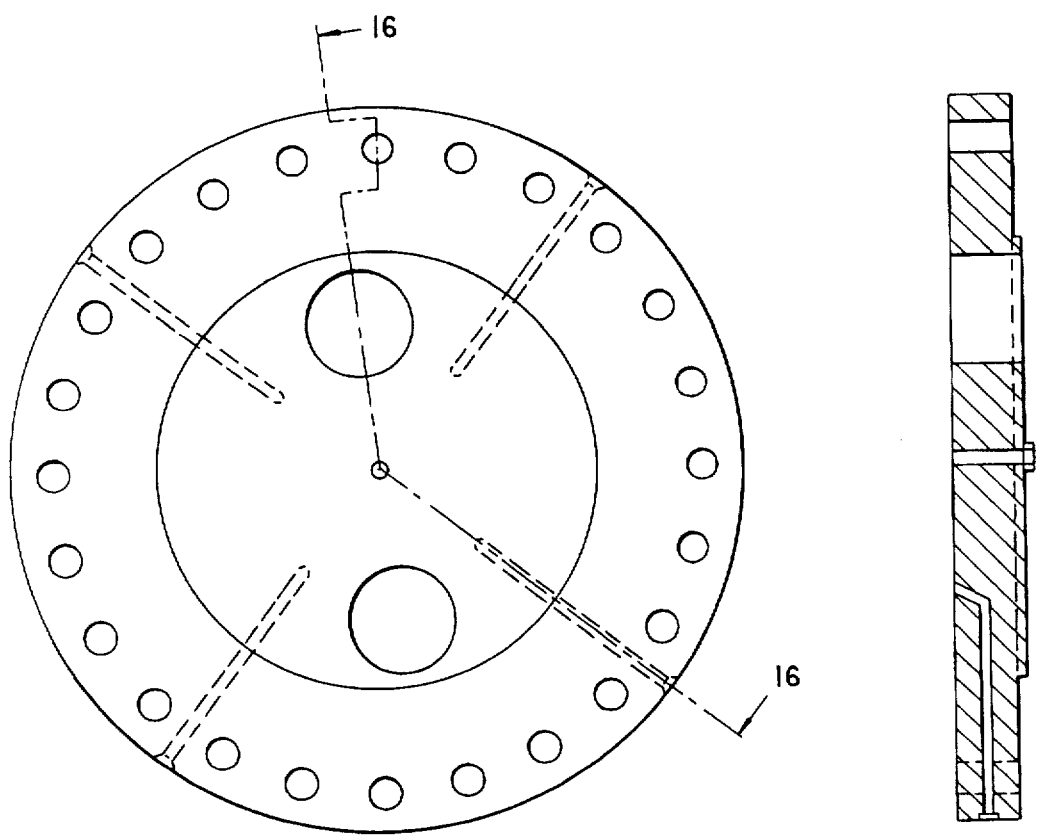
FIG. 15 is a plan view of a ported top member to cap the rotor housing shown in FIG. 10 over a rotor as shown in FIGS. 11 and 12 and preferably over a piston/seal combination which is itself separately or in conjunction therewith a ported top member.
FIG. 16 is a sectional view A—A of the member of FIG. 15 showing one of the preferred four steam ports to a perimeter of the member or assembly of FIG. 15.

The piston 17 can be actuated by steam pressure so that when the pressure cylinder port 26 (see FIG. 8) is pressurised, the chamber 27 above the piston 17 is filled with steam forcing the piston 17 down on to the rotor so that it is clamped between the top and bottom PEEK seal plates 18 and 19 respectively. The rotor (see FIGS. 11 and 12) is contained inside the barrel (see FIG. 10) and the top and bottom plates (see FIGS. 15, 16, 13 and 14) all clamp together to make a pressure tight container. The container is itself pressurised with steam from the higher pressure side via the "typical body pressurising port" 28 (see FIG. 8). The purpose of this is to reduce the differential pressures across the seal when the rotor compartments are in register with the high pressure side (PII). Some of the steam used for pressurising will unavoidable condense, in particular during start up and phasing down operation when there is a significant temperature differential between the steam and the wall of the device. Condensed water is purged regularly by means of commonly available devices.

The auger 29 (see FIGS. 8 and 9) is the means by which material is delivered from two elbows 30 (see FIG. 9) that is one either side of the drive shaft 24 and at 90° to inlet compartments which are shown in cross section. These inlet compartments passageways 32 are shown as being connected to the feeder tubes or in ported register which are fed from a single pipe above with the flow splitter arrangement. The flow splitter is shown in a pressure containment vessel at the top because it is preferably made from relatively light material, unable to stand pressure, which would be vented. In some applications, in order to meter the feed of materials into the carousel chamber so that an excess of material does not create shearing wear when the carousel moves, a suitable device such as a flip-flop vane, auger, fee screw, ram or any other suitable mechanism can be used ahead of the flow splitter. The timing of the action of such device is coupled to the movement of the carousel and the filling of each chamber by means of suitable sensors. Generally in a series of units passing the particulate material through a series of systems, all units will cycle at the same speed and in unison. The initial unit at the infeed end can be slightly less capacity than successive units. This will tend to load the successive units to a lower level in order to prevent overfilling and consequent shearing wear. Another embodiment would be to hinge a "trembler" vane at the lower end of the flow splitter 31 to oscillate at a fast rate to direct the flow alternately to each of the compartment pairs.

Figure 22:
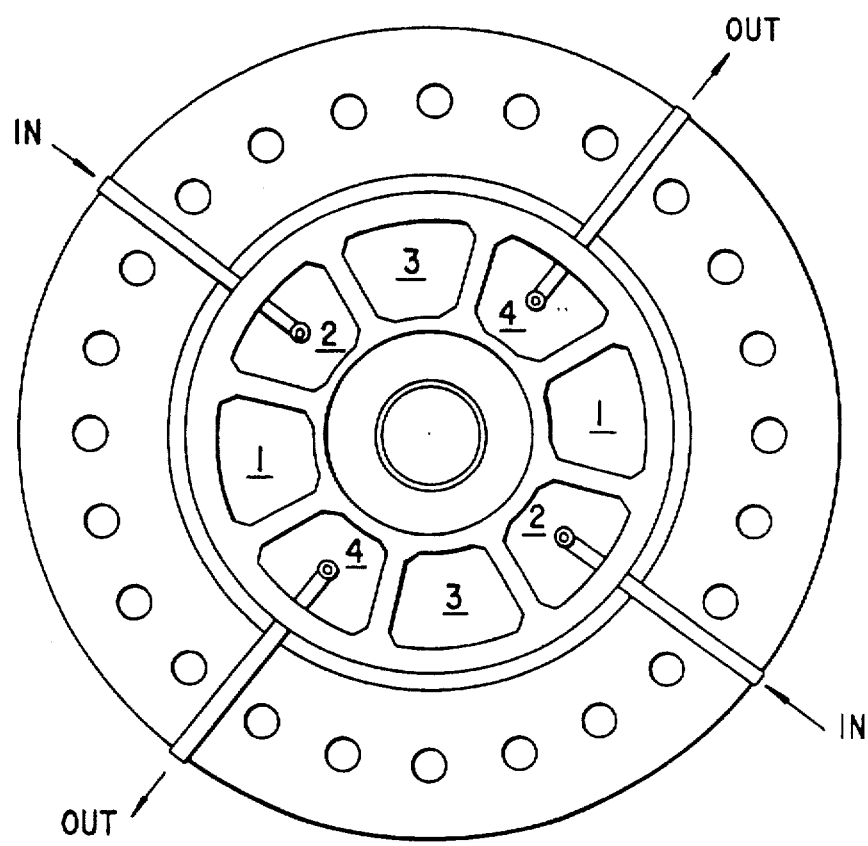
FIG. 22 is a similar view to that shown in FIG. 5A but showing how in the preferred form of the present invention there can be steam inflows and steam outflows into passageways numbered in pairs 1 through 4 for ease of explanation hereafter and designating fluid inflows and outflows by the words "IN" and "OUT" respectively.

The flow splits into two streams which enter the rotor as shown via the two pipes 34 which are fixed to the top cap plate 33 and which extend partially through bores in the piston 17 and its seal 18. The piston 17 is a sliding fit on these pipes 34 to facilitate the movement of the piston 17 which is in reality almost imperceptible. The arrangement serves to take up wear on the seals of the rotor. The ports 35 shown as entering by "L" shaped drillways are not necessarily disposed as shown because they take up a very accurately placed radial position, as shown in those drawings which shows the bottom plate of the barrel in plan. The steam directions are shown in FIG. 22 where diagonally opposite drillways are shown with "IN" and "OUT" arrows. The two "outs" are connected together and this is where the compartments are vented of the high pressure steam collected from the drop out passageway (compartment) before it moves into the fill compartment. The two "in" ports are where the steam from the higher pressure system is introduced to the compartments during the dwell period before they move on to the high pressure zone for the drop out phase. One must imagine the material from compartments 3 in FIG. 22 registering with the cut outs of FIG. 13, so that the material drops out of the cut outs into the two elbows which are shown in outline surrounding the cut out.

For the purpose of interrupting the passageways or compartments 1 through 4 shown in pairs in FIG. 22 it should be appreciated that the rotational direction of the rotor is clockwise and 1 is the "fill compartment", 2 is the "filled dwell compartment", 3 is the "drop out compartment" and 4 is the "empty dwell compartment". "IN" is where the higher pressure (PII) enters and "OUT" is where the venting (PII-PI) occurs.

Figure 21:
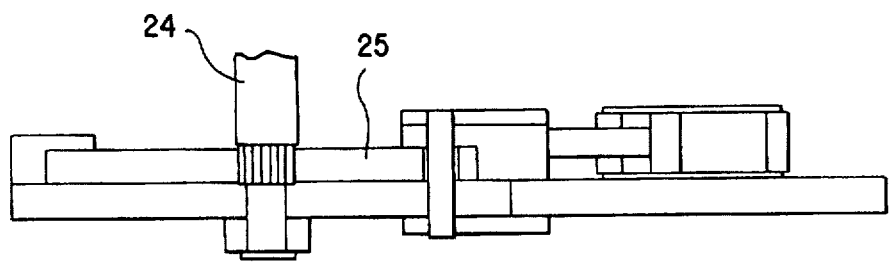
FIG. 21 is a view of the arrangement shown in FIG. 20 in elevation.

The ratchet arrangement of FIGS. 20 and 21 will move the rotor stepwise through 45° increments. The operation of the stepwise actuator and the related regulation of the pressure applied to the rotor seals by the piston all by any appropriate means is very important. When full pressure steam is applied to the piston top a total sealing action will occur which will prevent any flow of steam from the higher to the lower pressure systems (or to atmosphere). However, with such heavy pressure it will be impossible (or at least very difficult) to move the rotor except with an extremely large force. During the rotation mode pressure is vented from the compartment 27 above the piston 17 to facilitate the turning of the rotor through 45° with quite low force.

If we assume that the rotor is operating at 5 r.p.m. it means that there will be 40 such motions per minute, i.e. 8 compartments×5 revolutions. This means that the time for each 45° movement is 1.5 seconds. It is of great advantage to operate the unit in such a way that each 45° incremental movement occurs in 0.5 seconds and that the rotor is quasistationary for 1 second in such a case. The benefits of this are that the load on the seals is relieved for 0.5 seconds only in each 1.5 second cycle, so that perfect sealing will occur for ⅔rds of real time. In the case of a slower rotational speed the ratio would increase because incremental movements would still occur in one half second leaving a longer period for the locked situation. The only time when leakage can occur is during the period when the incremental movement takes place. However, sufficient load will be left on the seal during the movement so that very little leakage should occur anyway. The system allows for automatic compensation for wear.

The rotor of the present invention requires end sealing only. Prior art valves frequently require circumferential sealing because they run with a horizontal axis.

FIG. 6 shows the device as a four compartment valve and in effect that is true because in the eight compartment version two compartments are fling and two are dumping simultaneously. A four compartment valve is technically feasible but presents real difficulties in design and is not really practical. The eight system works well and everything fits together in practice.

ADVANTAGES

1) Alternatives are limited in throughput capacity because of the need for a horizontal axis to achieve a vertical flow. We use a vertical axis for a vertical flow.

2) Using a vertical axis and vertical flow means that units of different flow capacity use standard parts; only the length changes.

3) The rotating parts do not require circumferential sealing, [an immensely important factor in friction based torque loading, wear, sealing and cost].

4) Rotor end sealing only is needed which permits the use of a modern high performance polymer for steam sealing while the barrel containing the rotor is pressurised to reduce cross port differentials.

5) The motion of the interlock is stepwise in 45° increments so that at 5 rpm 40 stepped movements occur. The rotor compartments are charged and discharged during the dwell periods when the rotor is static at which time the seals are heavily steam loaded to totally prevent steam leakage. Because such loads act like a locked on disc brake, the steam pressure on the seal piston is momentarily released during the rapid rotation phase. This means that minor steam leakage can only occur during a 0.5 second proportion of each 1.5 second cycle. Wear is dramatically reduced because seal loads are low.

6) The unit is designed to avoid metal to metal sliding contact and although pressure differentials will be preferably kept below 16 bar across the ports, each unit preferably must be capable of safely withstanding up to 36 bar real internal pressures. Alternatives cannot perform such duty without becoming intolerably massive.

7) We rely preferably upon gravity although the material may be propelled in and out of the compartment if required by its nature or texture. This is true of all versions. Our interlock has a special advantage because of the stepwise motion. Where other valves move at a constant rotation, our valve spends a high proportion of the total real time in a stationary condition, permitting the longest possible time for unobstructed loading and unobstructed unloading, whilst perfectly in register with the respective slots.

Persons skilled in the art will appreciate the use than can be made of such a transfer device.

I claim:

1. A transfer device for, or operatively incorporated in a system for, transferring materials from one fluid environment to another without substantial loss of one fluid into the other owing to any pressure differential between the environments, said device being of a kind having a top member or assembly having at least one port (hereinafter "ported top member") to receive to said port(s) from above fluid and materials of said one fluid environment, a bottom member or assembly having at least one port (hereinafter "ported bottom member") to lead down into said second fluid environment, and a rotatable rotor or carousel member (hereafter "carousel member") having a plurality of both opened topped and opened bottomed passageways, each capable of being serially (a) registered to a port of said ported top member while out of register with any port(s) of said ported bottom member, (b) out of register with any port(s) of said ported top and bottom members, and (c) registered to a port of said bottom ported member while out of register with any port of said ported top member, the device being characterised in that there is provided means to rotate said carousel member intermittently so that each passageway can in its turn progress through the conditions (a), (b) and (c) serially with a dwell period at each and being further characterised in that means is provided to maximise a sealing pressure to the assembly such that each of said ported top and ported bottom members seal about the open topped and open bottom passageways of the rotatable carousel member more during any such dwell period than at any time when the carousel member is being moved.

2. A transfer device as claimed in claim 1 wherein said intermittent movement is such that each of said dwell periods is longer than each of the periods of time needed to move the rotatable carousel members between adjacent cyclic conditions.

3. A transfer device as claimed in claim 1 wherein a fluid pressure provides said sealing pressure, one or other of said ported top and ported bottom members having at least one part thereof acting as a piston movable parallel to the rotational axis of said carousel member by selective pressurisation of a cylinder or chamber closed by said piston, an increased pressurisation increasing the sealing pressure.

4. A transfer device as claimed in claim 3 wherein means is provided whereby said cylinder(s) or chamber(s) of said piston or pistons are capable of being vented to reduce the sealing pressure.

5. A transfer device as claimed in claim 3 when operatively connected into a system and the fluid pressure in one or other of said fluid environments is higher than the other.

6. A transfer device as claimed in claim 5 wherein the fluid pressure of that environment having the higher pressure is used as a means of pressurising that piston integral with or which indirectly acts upon one or other of said ported top and ported bottom members so as to increase the sealing pressure.

7. A transfer device as claimed in claim 1 wherein there are two ports in each of said ported top and ported bottom members and six or eight passageways in said rotatable carousel members such that for each condition a passageway has of the kind (a) and subsequently (c), there is therebetween one or two positions (b).

8. A transfer device as claimed in claim 1 wherein said rotatable carousel member includes an axial shaft having axially distanced from said passageways a pawl drivable ratchet wheel, the interengagement and operation of which provides the required intermittent movement of said rotatable carousel member in use.

9. In a steam hydrolysis and drying plant for lignocellulosic materials the use of a transfer device as claimed in any one of the preceding claims to pass, with gravity assistance, the solids stream for a primary steam system into a lower but still elevated pressure secondary steam system, both systems being at elevated temperature(s), said sealing pressure(s) reducing steam flow from one system to the other.

10. A plant of claim 9 wherein the sealing pressure during dwell periods prevents steam moving between the systems.

* * * * *